United States Patent
Toub et al.

(10) Patent No.: US 10,452,534 B2
(45) Date of Patent: Oct. 22, 2019

(54) ASYNCHRONOUS OPERATION QUERY

(71) Applicant: Microsoft Technology Licensing, LLC, Redmond, WA (US)

(72) Inventors: Stephen H. Toub, Winchester, MA (US); Clayton L. Culver, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/614,073

(22) Filed: Jun. 5, 2017

(65) Prior Publication Data
US 2018/0349267 A1    Dec. 6, 2018

(51) Int. Cl.
*G06F 12/02* (2006.01)
*G06F 12/126* (2016.01)
*G06F 11/07* (2006.01)
*G06F 11/36* (2006.01)

(52) U.S. Cl.
CPC ...... *G06F 12/0246* (2013.01); *G06F 11/0703* (2013.01); *G06F 11/3632* (2013.01); *G06F 12/023* (2013.01); *G06F 12/126* (2013.01)

(58) Field of Classification Search
CPC ............. G06F 11/3636; G06F 11/3632; G06F 11/0703; G06F 12/0246; G06F 12/023; G06F 12/126
USPC .................................................. 717/124–135
See application file for complete search history.

(56) References Cited

U.S. PATENT DOCUMENTS

| | | | |
|---|---|---|---|
| 7,631,304 B2 | 12/2009 | Bearman et al. | |
| 8,032,886 B2 | 10/2011 | Joy et al. | |
| 8,572,585 B2 | 10/2013 | Toub et al. | |
| 9,092,564 B2* | 7/2015 | Wischik | G06F 11/3632 |
| 9,164,876 B2* | 10/2015 | He | G06F 11/3664 |
| 9,170,915 B1 | 10/2015 | Fateev | |
| 9,411,568 B2* | 8/2016 | Syme | G06F 8/445 |
| 9,582,312 B1* | 2/2017 | Karppanen | G06F 9/461 |
| 2011/0252073 A1* | 10/2011 | Pauly | G06F 17/30091 707/812 |
| 2012/0266144 A1* | 10/2012 | Halliday | G06F 8/00 717/129 |
| 2014/0237452 A1* | 8/2014 | Wischik | G06F 11/3632 717/125 |
| 2016/0124783 A1* | 5/2016 | Puvvada | G06F 9/547 719/330 |
| 2018/0349267 A1* | 12/2018 | Toub | G06F 12/0246 |

OTHER PUBLICATIONS

Davies, Alex, "Async in C# 5.0", Retrieved From: https://the-eye.eu/public/Books/IT%20Various/async_in_c_5.0.pdf, Sep. 7, 2012, 106 Pages.

(Continued)

*Primary Examiner* — Marina Lee
(74) *Attorney, Agent, or Firm* — Dicke, Billig & Czaja, PLLC

(57) ABSTRACT

A query an asynchronous operation of an asynchronous function is disclosed. One or more state machine objects of the asynchronous function are identified. The identified objects of the asynchronous function are queried to determine information regarding the current state of the identified objects. For state machines that have not completed, the heap is examined to determine whether the identified object is rooted.

20 Claims, 2 Drawing Sheets

(56) References Cited

OTHER PUBLICATIONS

"International Search Report and Written Opinion Issued in PCT Application No. PCT/US2018/034977", dated Aug. 29, 2018, 15 Pages.
Skeet, Jon, "Section 15.5 from Chapter 15 Asynchrony with async/await, C# in Depth Third Edition", Retrieved From: https://manning-content.s3.amazonaws.com/download/1/643e26c-c98b-4659-9133-785f47c795aa/Section15.5.pdf, Jan. 1, 2014, 16 Pages.
Deligiannis, et al., "Asynchronous Programming, Analysis and Testing with State Machines", In Proceedings of the 36th ACM SIGPLAN Conference on Programming Language Design and Implementation, Jun. 13, 2015, 11 pages.

* cited by examiner

ASYNCHRONOUS OPERATION QUERY

BACKGROUND

Software development technologies have advanced to provide many developers with additional tools to readily create programs with rich user experiences adapted for multiple platforms and systems with customization for selected user groups in ways once only available to the most advanced developers. An example includes the use of asynchronous programming models to perform such actions as accessing a resource, offloading a computation, and reading files from storage. Traditionally, asynchronous programming models were more difficult to understand or implement as compared to the commonly used and relatively straightforward synchronous programming model. Many popular programming languages, frameworks, and runtimes now include features that facilitate asynchronous programming. Software diagnostic technologies such as debuggers, however, may not have addressed the traditional difficulties of troubleshooting asynchronous processes.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Debugging includes a methodical process of finding and reducing the number of bugs, or defects, to make a computer program behave as expected. Debugging in general can be a lengthy and tiresome task, and developers often use software tools such as a debuggers and debugger extensions to monitor live execution of the computer program or memory dumps that include the recorded state of a working memory of the computer program at a given time, such as at program crash. Debugging of asynchronous functions may struggle to keep up with improvements in development technologies.

The disclosure relates to a method to query an asynchronous operation of an asynchronous function, and can be implemented in a diagnostic tool including a debugger or debugger extension. In one example, the objects of a heap are enumerated. One or more state machine objects of the asynchronous function are identified. The identified objects of the asynchronous function are queried to determine information regarding the current state of the identified objects. For example, the query can determine whether the state machine has completed. For state machines that have not completed, the heap is examined to determine whether the identified object is rooted.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
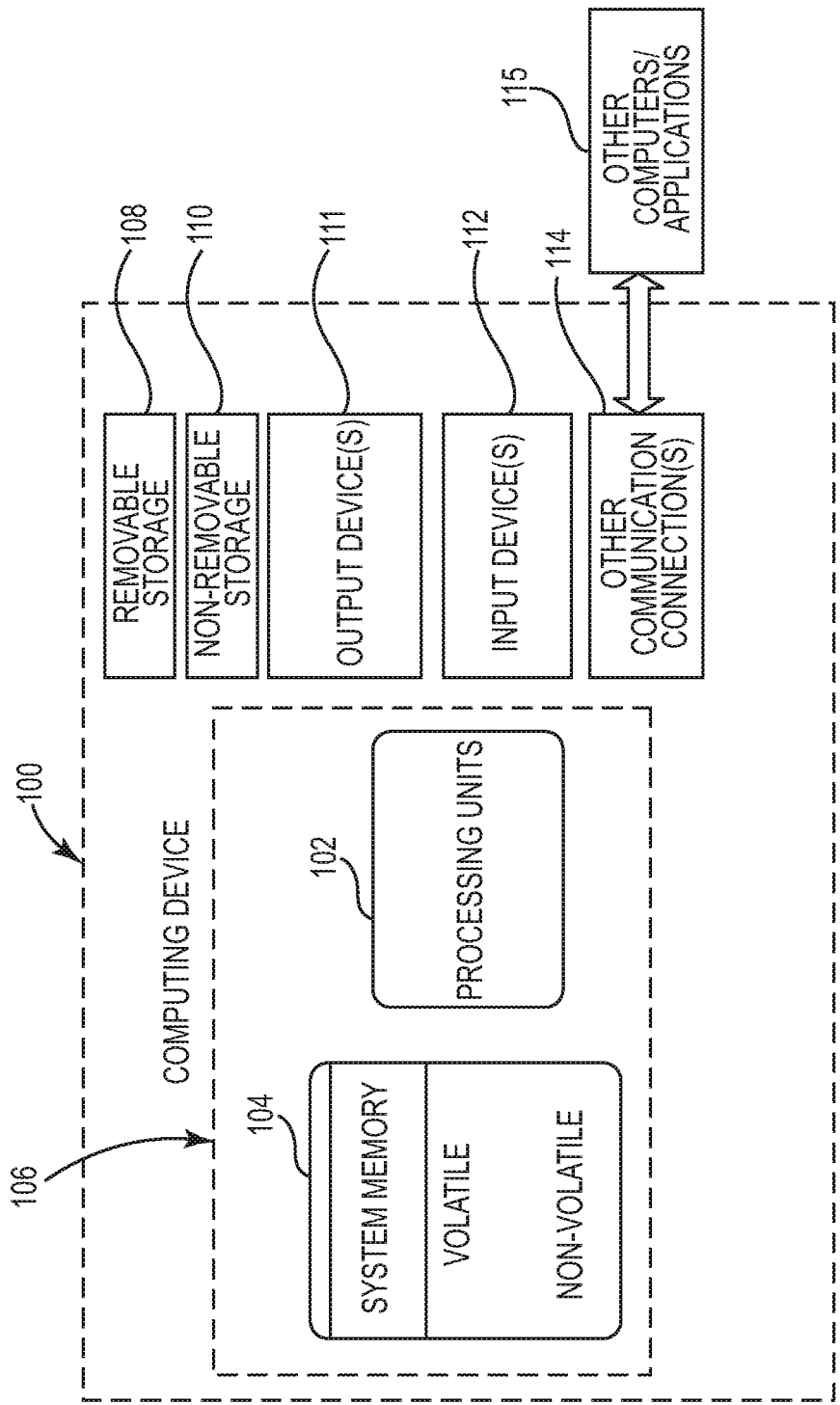
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the interne, or other network.

Computing device 100 can be configured to run an operating system software program and one or more computer applications, which make up a system platform. A computer application configured to execute on the computing device 100. A computer application, or computer program can be implemented as a set of instructions stored in the memory 104, and the processor 102 can be configured to execute the instructions to perform a specified task or series of tasks. In one example, the computer application can make use of functions either coded into the program itself or as part of library also stored in the memory 104.

In one example, the memory 104 can include a software framework to provide a functionality that can be selectively changed with additional developer-written code, such as managed code, which can be implemented on computing device 100. The framework can be used with developer-written software applications created in one or more framework-compatible languages for one or more platforms. A framework can include a class library having a runtime library and base class library and an application engine such as a runtime system or virtual machine. In one example, the class library includes a set of classes organized by namespace to define features available in a framework-compatible programming language. Software applications written in a framework-compatible language as source code are compiled into a platform-neutral language, or bytecode, that can be executed in a platform-specific virtual machine installed on the platform, such as computing device 100. The runtime system compiles the bytecode into machine code that is executed on the platform. The runtime system can provide additional services including memory management, type safety, exception handling, garbage collection, security and thread management.

The software framework can include a managed heap that is a region of memory 104 in which reference objects created by an application are stored. The lifetime of objects are managed by the garbage collector. The garbage collector uses references to keep track of objects that occupy blocks of memory. A reference is created when an object is created and assigned to a variable. A single object can have multiple references. For example, additional references to an object can be created by adding the object to a class, collection, or other data structure, or by assigning the object to a second variable. For each application, the garbage collector maintains a tree or graph of references that tracks the objects referenced by the application. The reference tree has a set of roots, which includes global and static objects, as well as associated thread stacks and dynamically instantiated objects. An object is rooted if the object is referenced directly by a root or if there is at least one other rooted object that holds a reference to the object. The garbage collector can reclaim the memory of an object when the object is no longer rooted. Accordingly, any object referenced by a garbage collector root will be kept alive and not reclaimed in the next garbage collection.

A function is a sequence of computer program instructions packaged as a unit that performs a specific task. This unit can then be used in a program or programs in which that particular task is to be performed. Functions may be defined within programs or separately in libraries that can be used by multiple programs. A function is often coded so that it can be started or called several times and from several places during one execution of the program, including from other functions, and then branch back or return to the next instruction after the call, once the task is complete. In different programming languages, a function may be called a procedure, a subroutine, a routine, a method, a subprogram, or generically as a callable unit.

Most modern implementations of functions make use of a call stack, a case of the stack data structure often in a contiguous area of the memory 104, to implement function calls and returns. Each function call creates a new entry, or stack frame, at one end of the stack. When the function returns, the stack frame is deleted from the stack, and the space may be used for other function calls. Each stack frame can include the private data of the corresponding call, which typically includes parameters and internal variables, and the return address, i.e., the address of the instruction after the call. A call stack is used to keep track of the point to which each active function should return control when it finishes executing. An active function is one that has been called but is yet to complete execution after which control should be handed back to the point of call, or calling function. Developers often use the call stack to determine code locations and origins. Asynchronous and event driven paradigms, however, drastically reduce the ability to orient via the call stack.

Asynchronous programming is useful for enhancing the overall responsiveness of an application. For example, asynchronous programming can be applied to activities that are potentially blocking, such as accessing resources on the internet, which at times can be slow or delayed. If such activities are blocked within a synchronous function, the synchronous caller will wait. If an asynchronous function is used, the application can continue with other activities that do not depend on the internet resource until the potentially blocking task finishes. Traditional techniques for writing asynchronous applications have been complicated, however, making the applications difficult to write, debug, and maintain.

Recent technologies have simplified asynchronous application development. For example, asynchronous programming includes support in available frameworks and runtimes such as those under the trade designation .NET Framework and Windows Runtime available from Microsoft, Inc., of Redmond, Wash. Such technologies enable application to retain a familiar, logical structure that resembles synchronous code via use of the a sync modifier to designate asynchronous functions used with the await operator applied to a task in the designated asynchronous function in the C# language. Other examples include the Async and Await keywords can be applied in the Visual Basic language as well as the Promise class and the async and await keywords in the JavaScript language. The asynchronous function written in the C# language runs synchronously until it reaches its first await operator, at which point the function is suspended until the awaited task is complete and control returns to the caller of the function.

The traditionally difficult techniques of asynchronous programming are performed with the compiler, such as a bytecode compiler in an integrated development managed environment. Generally, the await operator used with an a sync modifier in the C# language does not block the thread on which it is executing. Instead, the compiler handles the rest of the asynchronous function as a continuation on the awaited task, and control returns to the caller of the asynchronous function. In one example, the compiler builds a state machine for the asynchronous function as a whole, and a continuation of a completed await task pushes the state machine to the next state. For instance, at compile time of an asynchronous method, a struct called a StateMa chine is generated that includes fields to save function local state. A moveNext function includes the code, which is separated into machine states for each await operation. At runtime, a task is created to run in the state machine code and local variables are include into the state machine as fields. The awaited task is run and the machine state is set to the next state to run when a wake-up is scheduled. The struct is created on the stack and boxed into the heap. As such, asynchronous functions using the await operator with an a sync modifier provides an example of a heap-based, compiler-implemented state machine.

Despite advances in asynchronous program development, the diagnosis of hangs, deadlocks and other application defects in asynchronous programs remains problematic. In synchronous programming, a debugger can enumerate the threads of a process to illustrate what threads are blocked and how they have arrived in the current state. In asynchronous programming, threads do not store state associated with the asynchronous operation. A traditional debugger or debugger extensions can have difficulty in determining the state and illustrating the causes of application defects.

Figure 2:
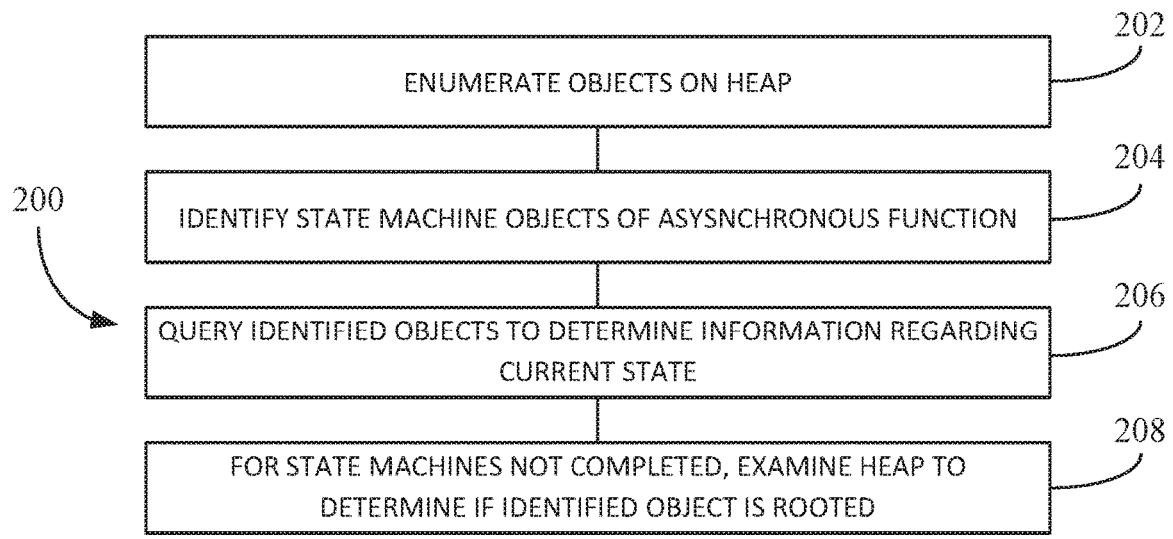
FIG. 2 is a block diagram illustrating an example method for execution in the computing device of FIG. 1.

FIG. 2 illustrates an example method 200 of querying an asynchronous operation. For example, method 200 can be applied to querying the state of objects of a heap-based, compiler-implemented state machine. The objects in a heap are enumerated at 202, such as from a heap dump (the recorded state of a working memory of the computer program at a given time) or a live process. The enumerated objects at 202 can include more than state machine objects of an asynchronous operation. The state machine objects of the asynchronous function are identified at 204. The identified objects of the asynchronous function are queried to determine information regarding the current state of the identified objects at 206. For example, the query at 206 can determine whether the state machine has completed. For state machines that have not completed, the heap is examined to determine whether the identified object is rooted at 208.

The heap can be programmatically inspected to enumerate objects at 202 via tools constructed for selected frameworks, runtimes, or programming languages. For example, debugging extensions and memory diagnostics libraries including application programming interfaces for selected frameworks and languages can be applied to enumerate objects on the heap at 202. One example debugger extension for inspecting a runtime state, and can be used with the C# language or the .NET Framework, is available under the trade designation SOS.dll from Microsoft, Inc. An example library of APIs available under the trade designation Microsoft.Diagnostics.Runtime component from Microsoft, Inc. With such tools, the heap objects from a heap dump or a live process can be enumerated.

The enumerated objects can be filtered to identify and select the state machine objects of the asynchronous function at 204. In one example, the state machine objects of the asynchronous function include objects generated in the programming language when the asynchronous function is run and an await operation in the function yields, which causes the state for the asynchronous function to be allocated on the heap. For instance, such objects can be identified via naming convention or when the object implements a particular compiler-used interface. One example of identifying objects of an asynchronous function via naming convention in the C# programming language includes searching for function names including "Async" having compiler-generated brackets around the function name. One example of identifying objects of an asynchrous function via interface includes searching for objects that implement IAsynchStateMachine interface that represents state machines generated in asynchronous functions of the C# programming language in the System . Runtime . CompilerServices namespace.

The identified and selected objects of the asynchronous function are queried to determine information regarding the current state of the identified objects at 206. For state machines that include references to the associated future object, such as Task or Task<TResult> in the C# programming language, a query can determine that future to establish whether the asynchronous operation has completed. The state machine can also be queried to determine the next state, such as the location of the return of a completed awaited operation to provide a location in the corresponding code being examined. If the operation has been completed, the result state can be determined (such as whether the operation was success, canceled, or faulted) and the associated state (such as the result in success or the exception in faulted).

For state machines that have not completed, the heap is examined to determine whether the identified object is rooted at 208. Objects that are not rooted can be enumerated to highlight operations that had all references dropped prior to completing. This information can be useful in identifying a program defect in which an asynchronous operation was awaited and the operation was never completed, which can manifest as a hang. Objects that are rooted can be used to create a chain of objects or other continuations in the reference tree as a virtual call stack that can be used to debug the application in the same manner as an actual call stack.

Figure 3:
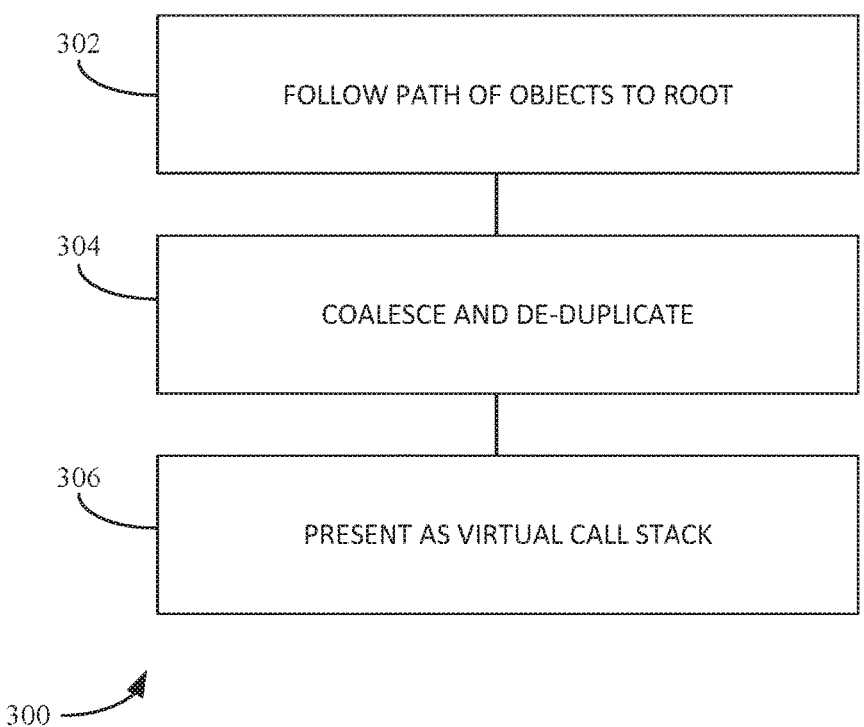
FIG. 3 is a block diagram illustrating an example method of the method of FIG. 2.

FIG. 3 illustrates a method 300 that can be applied in cases in which the state machine has not completed and the identified object is rooted at 208. The path or chain of objects and continuations to the root is followed and information is gathered at 302. The asynchronous function can generate a frame for the virtual call stack, and the last call in the chain can perform an operation that is rooted. Reversing this chain generates a path from the asynchronous function to the asynchronous operation state machine that is not completed. More than one chain can be included in the reference graph. The chains can then be coalesced and de-duplicated at 304, including removing chains subsumed by others, such that the longest chain remains. Coalescing and de-duplicating chains removes intermediate state machines from the virtual call stack, leaving the leaf-most asynchronous operation and the references chained to the root. The virtual call stack can be presented at 306, such as along side an actual call stack, in a visualization.

In another example, the method 300 can be applied to a case in which a thread is synchronously blocking waiting for a result of an asynchronous operation. In this case, the heap can be programmatically inspected to determine what object is blocking on the stack. For example, a debugging extension can be applied to determine if a the thread was blocked performing task .Wait( ) and to determine what that object is. A root is determined for this object, and a path or chain of objects can be followed to assemble a thread stack up to the Wait call at 302. This path or chain can be concatenated with the virtual call stack generated from path or chain of the task object to the root at 304.

In one example, the methods 200, 300 can be implemented as diagnostic tool configured to run as a computer program on the computing device 100. In one example, the methods 200, 300 can be implemented as an application configured to run as an extension to a debugger extension application. In other examples, the methods 200, 300 can be implemented as part of a debugger extension such as one available under the trade designation SOS.dll. Still further examples include the methods 200, 300 implemented as part of a debugger, such as one available under the trade designation WinDbg available from Microsoft, Inc., or as part of an Integrated Development Environment, or IDE, such as one available under the trade designation Visual Studio also available from Microsoft, Inc. The IDE can include a code editor, a compiler, build tools, a debugger and other tools for developing and testing an application. One example of a debugger system includes a computer program stored in memory 104 of computing device 100 implementing methods 200, 300 and interfacing with a debuggee process, which may be run on a separate computing device.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method performed by a computer system, comprising:
   identifying an object of a heap-implement state machine for an asynchronous function, the object of a set of objects;
   querying the object to determine a current state of the object;
   if the state machine has not completed, examining the heap to determine the object is rooted to a root; and
   generating a virtual call stack via coalescing and de-duplicating a chain of the set of objects to the root.
2. The method of claim 1 comprising:
   enumerating objects on a heap, wherein the object of the heap-implemented state machine is a subset of the objects on the heap.
3. The method of claim 2 comprising:
   enumerating objects from a heap dump or a live process.
4. The method of claim 2 comprising:
   filtering the enumerated objects of the heap to identify the objects of the heap-implemented state machine.
5. The method of claim 4 wherein the filtering includes:
   identifying objects via naming convention and interface implementation.
6. The method of claim 1 wherein the querying includes:
   determining the future of an associated object and a next state of the state machine.
7. The method of claim 6 comprising:
   determining a result state and an associated state of the result state if the state machine has completed.
8. The method of claim 1 comprising:
   identifying object references that were dropped prior to completing.
9. The method of claim 1 comprising:
   creating a chain of objects from the objects of the heap implemented state machine to a root.
10. The method of claim 9 comprising:
    presenting the chain of objects as a virtual call stack.
11. A computer readable storage medium, which does not include transitory propagating signals, to store computer executable instructions to control a processor to:
    enumerate a set of objects in a heap;
    identify from the set of objects an object of a heap-implement state machine for an asynchronous function;
    query the object to determine a current state of the object;
    if the state machine has not completed, examine the heap to determine the object is rooted to a root; and
    generate a virtual call stack via coalescing and de-duplicating a chain of the set of objects to the root.
12. The computer readable storage medium of claim 11, the computer executable instructions to control the processor to:
    if the object is rooted:
      gather information regarding the objects along a path to the root;
      coalesce and de-duplicate paths; and
      present the coalesced and de-duplicated path as a virtual call stack.
13. The computer readable storage medium of claim 12 wherein virtual call stack is presented as a visualization.
14. The computer readable storage medium of claim 12 wherein the coalesce and de-duplicate includes remove intermediate state machines.
15. The computer readable storage medium of claim 11 wherein the instructions are implemented as a diagnostic tool including a debugger.
16. A system, comprising:
    a memory device to store a set of instructions; and
    a processor to execute the set of instructions to:
      identify from a set of objects an object of a heap-implement state machine for an asynchronous function;
      query the object to determine a current state of the object;
      if the state machine has not completed, examine the heap to determine the object is rooted to a root; and
      generating a virtual call stack via coalescing and de-duplicating a chain of the set of objects to the root.
17. The system of claim 16 wherein the processor executes the set of instruction to:

if the object is rooted:
   gather information regarding the objects along a path to the root;
   coalesce and de-duplicate paths; and
   present the coalesced and de-duplicated path as a virtual call stack.

18. The system of claim 16 wherein the processor executes the set of instruction to:
   determine a result state and an associated state of the result state if the state machine has completed.

19. The system of claim 16 wherein the processor executes the set of instruction to:
   determine a next state of the state machine.

20. The system of claim 16 wherein the processor executes the set of instruction to:
   enumerate objects on a heap, wherein the object of the heap-implemented state machine is a subset of the objects on the heap.

* * * * *